United States Patent [19]

Postema

[11] Patent Number: 4,478,387

[45] Date of Patent: Oct. 23, 1984

[54] VALVE CONSTRUCTION

[75] Inventor: Pieter M. Postema, Oud-Beijerland, Netherlands

[73] Assignee: ITT Industries, Inc., New York, N.Y.

[21] Appl. No.: 313,725

[22] Filed: Oct. 22, 1981

[51] Int. Cl.³ ............................................. F16K 47/10
[52] U.S. Cl. ..................................... 251/121; 251/297;
91/422; 188/322.15
[58] Field of Search ...................... 137/516.11, 516.13,
137/516.15, 543.15; 251/121, 297; 92/222, 422;
188/285, 319, 320, 322.15

[56] References Cited

U.S. PATENT DOCUMENTS

| | | | |
|---|---|---|---|
| 394,424 | 12/1888 | Wilkinson | 251/297 X |
| 1,028,400 | 6/1912 | Stanton | 188/320 |
| 1,273,011 | 7/1918 | Snyder | 188/319 |
| 1,432,900 | 10/1922 | Quiroga | 251/121 X |
| 1,618,326 | 2/1927 | Cosentino | 188/319 |
| 2,487,472 | 11/1949 | Patriquin | 188/319 |
| 3,088,556 | 5/1963 | Bourcier De Carbon | 188/322.15 X |
| 3,365,033 | 1/1968 | Willich | 188/322.15 X |
| 3,827,538 | 8/1974 | Morgan | 188/319 |
| 3,937,307 | 2/1976 | de Kock | 188/319 |
| 4,298,102 | 11/1981 | Nishikawa et al. | 188/322.15 X |

FOREIGN PATENT DOCUMENTS

| | | | |
|---|---|---|---|
| 2548049 | 5/1977 | Fed. Rep. of Germany | 92/422 |
| 1100323 | 8/1955 | France | 188/319 |
| 739133 | 10/1955 | United Kingdom | 188/322.15 |
| 750522 | 6/1956 | United Kingdom | 188/322.15 |
| 1493607 | 11/1977 | United Kingdom | 188/322.15 |

Primary Examiner—Alan Cohan
Assistant Examiner—John A. Rivell
Attorney, Agent, or Firm—James B. Raden; William J. Michals

[57] ABSTRACT

A series of hydraulic shock absorbers all using the same piston. This is attained by giving no damping function to the liquid passages in the pistons, by which all pistons can be provided with an equal number of passages with a fixed, relative large cross-section. Thus, all pistons are equal. The damping function is taken over by an annular damping member between the piston and the valve.

1 Claim, 2 Drawing Figures

VALVE CONSTRUCTION

The invention relates to a value construction, in particular for use in a hydraulic shockabsorber, with a piston provided with liquid passages debouching on a seat face and a valve by which the liquid passages can be closed.

Such a valve construction is known from the Dutch patent specification No. 97.561.

The damping characteristic curve of a shock absorber provided with this known valve construction can be adjusted over a certain range by means of more or less tensioning of the valve spring. However, the adjustment range of a damping characteristic curve, obtained in this manner, is insufficient and is extended by selection out of a number of pistons of which the number and the cross section of the liquid passages to the seat face of the valve differ with respect to each other. In this way the damping characteristic curve can be varied over a wide range by selection of the proper piston combined with a certain adjustment of the valve spring tension.

A drawback of this adjustment method is that a great number of kinds of pistons, each with its own number and cross section of liquid passages must be manufactured and separately stored. This drawback is still increased in that the pistons in finished condition are very susceptible to damages.

Object of the valve construction according to the invention is to obviate this drawback. This is attained by giving no damping function to the liquid passages in the pistons, by which all pistons can be provided with an equal number of passages with a fixed, relative large cross section. Thus all pistons are equal. The damping function is taken over by an anhular damping member between the piston and the valve. By selection, with the assembling of the shock absorber, of a damping member out of a number of kinds of damping members with mutual different numbers and cross sections of damping passages, one keeps meeting the requirement of a very wide adjustment range and this with application of only one kind of piston.

The valve construction according to the invention is thus characterized by at least one anular damping member between the piston and the valve, said damping member being provided with a number of damping passages extending parallel to the axis of the valve construction.

A further advantage of the valve construction according to the invention is that the application of several stacked damping members between the piston and the valve considerably decreases the required number of different kinds of damping members. It can be simply seen that with the application of for example three different kinds of damping members, of which at most two are applied, nine different adjustments can be selected. It is also possible to provide the damping members with slots, whereby two damping members at a time are superimposed and a greater or smaller part of the slots is overlapped by relative rotation of the both damping members, by which is created a continuous or stepswise adjustment possibility.

The damping members are preferably manufactured by sintering of sinter material. In this manner damping passages in the damping members are obtained with a very constant size whereby subsequent calibration is not necessary. Moreover this material has a high wear resistance so that wearing of the damping members due to the moving contact with the valve is very small.

With the application of the valve construction according to the invention to a piston with a deepened seat face, such as for example is shown in the Dutch patent specification No. 97.561, a further advantage can be obtained. For very high demands are made upon a seat face of a valve with regard to the flatness and finishing in connection with leakage which otherwise will appear. However, it is difficult to obtain a deepened seat face for such a finishing. With the application of intermediate damping members according to the invention the demands made upon a deepened face are decreased and this face doesn't cooperate with the valve anymore. The face that now is cooperating with the valve forms part of the damping member which, of course, already has been planed by grinding before mounting thereof.

Hereafter the invention will be further explained with reference to the drawings showing by way of an example an embodiment of the construction according to the invention.

Figure 1:
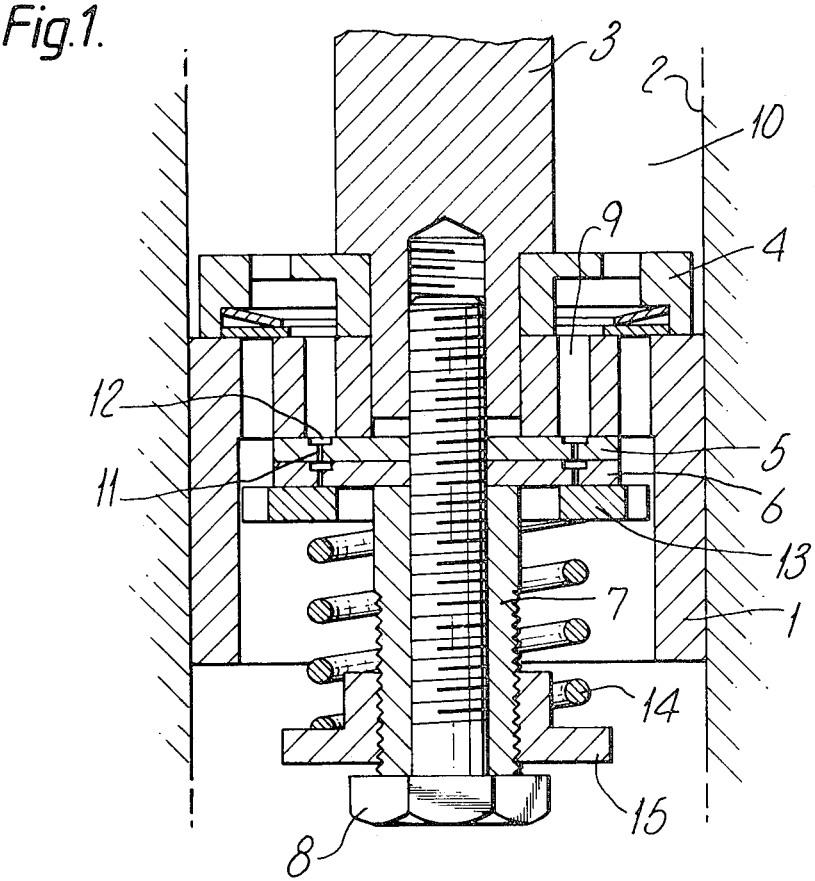
FIG. 1 shows a longitudinal section of a part of a hydraulic shock absorber wherein a valve construction according to the invention is applied.

FIG. 1 shows a piston indicated by the reference number 1, which piston can move in a schematically shown cylinder 2. The piston rod 3 and the piston 1 are fixedly interconnected in that the latter is enclosed between the valve house 4 on the one side and the annular damping members 5 and 6 and the sleeve 7 on the other side, the whole being kept together by means of a bolt 8 threaded in the piston rod 3. Piston 1 is provided with a number of liquid passages 9 spaced equally from the axis said passages on the one side being in communication through the valve house 4 with the space 10 and on the other side debouching on the damping member 5. Each of the damping members 5 and 6 comprises a number of calibrated damping passages 11 regularly spaced over a pitch circle, said damping passages debouching on a circular groove 12. The damping passages of the damping members 6 debouch against the annular valve 13 provided with a few radial cams, which valve is pressed against the damping member 6 by means of a spring 14. The thrust of this spring can be adjusted by rotating the adjustment nut 15.

The shock absorber functions with an outward stroke as follows. At the initiation of this movement a pressure will be built up in the space 10, which pressure is transmitted through the medium within the valve house 4, the liquid passages 9, the groove 12 and the damping passages of the damping member 6 up to against the valve 13. At the moment that the pressure is increased to such an extent that the valve is lifted opposite to the thrust of the spring 14, the medium will flow from the space 10 to the space at the other side of the piston.

During the movement the desired piston velocity/damping force characteristic must be obtained. The desired characteristic can be obtained by a combination of a spring adjustment of spring 14 by means of the adjustment nut and a selection of the number and the kind of damping members 5 and 6. If one can select the damping members out of four kinds, each kind comprising another number of damping passages or another diameter of damping passages, it can be simply seen that already 15 combinations of damping members are possible when two damping members at a time are placed in the valve. Of course it is also possible to apply one damping member for each valve construction, in which case for each different damping member adjustment another kind of damping member is required.

Figure 2:
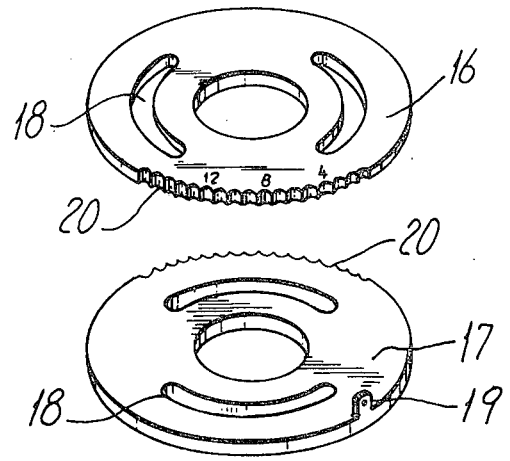
FIG. 2 shows in perspective a set of damping members according to a modified embodiment.

The valve construction according to the invention can also be provided with damping members with another embodiment. This embodiment is shown in FIG. 2, in which the two damping members 16 and 17 are completely equal but are only placed in another position. Both damping members are shifted into each other from the drawn position and applied in the valve construction instead of the damping members 5 and 6. The damping action of both damping members together is determined by their relative position; by relative rotation the overlapping portion of the slot shaped channels 18 becomes smaller or larger and therewith the damping action is increased or decreased. In order to assure that a selected position doesn't alter, each damping member is provided with a cam 19, engaging one of a series of recesses 20 at the periphery of the other damping member when both damping members are shifted into each other in a certain position. Therewith a lock is provided. The recesses are numbered so that during mounting an adjustment can be selected in a simple way. Naturally the cam 19 of damping member 16 is located at the bottom side and can not be seen in the drawings.

The different damping members can be manufactured at low costs according to sinter techniques with such close tolerances that no finishing or calibration is required. Moreover the material has a very high wear resistance which is advantageous because the movable valve 13 bears against it.

The damping during the inward stroke of the shock absorber is assured by a radial more outward valve construction forming no part of the invention. The function thereof is obvious so that a further description thereof can be omitted.

I claim:

1. A valve construction for use in a hydraulic shock absorber including a piston provided with liquid passages debouching on a seat face and a valve operatively coupled to close the liquid passages, comprising two annular damping members arranged between the piston and the valve, each damping member being provided with a plurality of damping passages extending parallel to the axis of the valve construction, wherein the damping passages in the damping members are slot shaped, said slots extending over a part of a concentric circle, whereby adjustment of the damping characteristic occurs by relative rotation of both damping members and wherein each damping member is provided with an axially projecting cam co-extensive with its radially facing outer peripheral edge which engages a corresponding selected one of a plurality of recesses provided along the radially facing outer peripheral edge of the other damping member.

* * * * *